(12) United States Patent
Cottrell et al.

(10) Patent No.: US 10,773,453 B2
(45) Date of Patent: Sep. 15, 2020

(54) MACHINE AND METHOD FOR INSTALLING A COATING SHEET OVER WELDED END SECTIONS OF PIPELINE

(71) Applicant: SERIMAX HOLDINGS, Roissy-en-France (FR)

(72) Inventors: Terence Cottrell, Burnley (GB); Louis-Nicolas Hallez, Preston (GB); Gareth Owen, Skelmersdale (GB); Andrew Stribley, Lancashire (GB)

(73) Assignee: SERIMAX HOLDINGS, Roissy-en-France (FR)

( * ) Notice: Subject to any disclaimer, the term of this patent is extended or adjusted under 35 U.S.C. 154(b) by 143 days.

(21) Appl. No.: 16/072,402

(22) PCT Filed: Feb. 9, 2017

(86) PCT No.: PCT/EP2017/052817
§ 371 (c)(1),
(2) Date: Jul. 24, 2018

(87) PCT Pub. No.: WO2017/137474
PCT Pub. Date: Aug. 17, 2017

(65) Prior Publication Data
US 2019/0030786 A1  Jan. 31, 2019

(30) Foreign Application Priority Data
Feb. 12, 2016 (EP) ..................... 16155584

(51) Int. Cl.
*B29C 63/06* (2006.01)
*F16L 58/18* (2006.01)
(Continued)

(52) U.S. Cl.
CPC .......... *B29C 63/06* (2013.01); *B29C 63/0065* (2013.01); *B29C 63/024* (2013.01);
(Continued)

(58) Field of Classification Search
CPC .............. F16L 58/181; F16L 13/0272; Y10T 156/1348; Y10T 156/1788; B29C 63/06;
(Continued)

(56) References Cited

U.S. PATENT DOCUMENTS 2,696,865 A  12/1954  Seiler
3,656,513 A   4/1972  Evans et al.
(Continued)

FOREIGN PATENT DOCUMENTS

GB       2 290 047 A       12/1995
WO    WO 2008/107759 A1    9/2008

OTHER PUBLICATIONS

International Search Report dated May 4, 2017 in PCT/EP2017/052817 filed on Feb. 9, 2017.

*Primary Examiner* — Carson Gross
(74) *Attorney, Agent, or Firm* — Oblon, McClelland, Maier & Neustadt, L.L.P.

(57) ABSTRACT

A pipe joint coating for welded ends of pipes forming a pipeline. A last and third layer of a 3LPP coating system covering at least a circumferential weld area of the pipe joint is a heated sheet applied around the pipe with a machine including a mounting frame and a transport carriage rotatably movable on the mounting frame to move circumferentially about the pipe joint, and a roller applying an adjusted pressure to the sheet against the pipe and adapting to eccentricity or ovality of the pipe. The sheet is pressed below the pipe away from its overlapping ends, a first part of the sheet is then applied when the roller is rolled in a first direction, and a second part of the sheet is applied by the roller rolled back in the reverse direction around the pipe. The sheet is dimensioned to obtain an overlapped area between its extremities.

22 Claims, 6 Drawing Sheets

(51) Int. Cl.
*B29C 63/00* (2006.01)
*B29C 63/02* (2006.01)
*F16L 13/02* (2006.01)
*B29C 63/14* (2006.01)

(52) U.S. Cl.
CPC ........ *F16L 58/181* (2013.01); *B29C 63/0013* (2013.01); *B29C 63/145* (2013.01); *F16L 13/0272* (2013.01); *Y10T 156/1348* (2015.01); *Y10T 156/1788* (2015.01)

(58) Field of Classification Search
CPC ....... B29C 63/12; B29C 63/14; B29C 63/145; B29C 53/562
USPC ........................................................ 156/574
See application file for complete search history.

(56) References Cited

U.S. PATENT DOCUMENTS

| | | | |
|---|---|---|---|
| 4,459,251 A | 7/1984 | Eldridge et al. | |
| 5,588,780 A | 12/1996 | Wolbers et al. | |
| 8,910,852 B2 * | 12/2014 | Cittadini Bellini | B23K 37/0533 228/176 |
| 2010/0186881 A1 | 7/2010 | Bergonzio | |
| 2011/0259509 A1 | 10/2011 | Pirie et al. | |
| 2011/0297316 A1 | 12/2011 | Jackson et al. | |
| 2014/0076483 A1 | 3/2014 | Pirie et al. | |

\* cited by examiner

MACHINE AND METHOD FOR INSTALLING A COATING SHEET OVER WELDED END SECTIONS OF PIPELINE

The present invention relates generally to machines providing a protective synthetic resin coating and to methods of installing such a coating to welded end sections of pipeline.

BACKGROUND OF THE INVENTION

It is conventional in the pipeline industry to coat steel pipe on pipelines for corrosion protection purposes. Such coatings were applied on the exterior surface of each section or length of pipe, except for exposed short end portions or stubs of the pipe initially left bare or unprotected so that the pipe end sections could be welded together to form the pipeline as it was being laid. The coating on pre-coated section of the pipe is called the "factory coating" (FC).

One type of parent coating that is often used is a Three Layer Coating, which might be Polypropylene (3LPP or Three Layer PP), or Polyethylene (3LPE or Three Layer PE). Three Layer coating is a complete corrosion protection system composed of three elements (layers) working together. The first layer is a fusion bonded epoxy (FBE) coating. The second layer is a chemically modified PP or PE adhesive. The third layer is a co-polymer outer layer in varying thicknesses, usually several millimeters thick. Combined as a system these elements work together to protect the pipe from undesirable corrosion, wear and impact damage.

After welding the sections together, the uncoated area around the weld must then be coated to create a continuous corrosion protection with the "factory coating". This area is called the "field joint" or "joint" (FJ).

The joint area also had to be provided with a corrosion protective coating system. A compatible field joint coating system for 3LPP or 3LPE coated pipelines comprising a heat assisted helically wrapped tape application system from U.S. Pat. No. 7,243,697, is known prior art. This system utilizes existing equipment for abrasive blasting or surface preparation and application of a first fusion bonded epoxy (FBE) layer, then covered with chemically modified polypropylene (CMPP) or polyethylene (CMPE) dual powder second layer. Then a third layer is immediately applied by the machine helically wrapping applied polypropylene (PP) or polyethylene (PE) tape, where the tape overlaps each preceding wrap and is also overlapping the factory coating to create a continuous coating. A known drawback of this solution arises from the multitude of overlapping jointed layers.

Another joint coating is provided by longitudinal sheet wrap which involves wrapping a sheet of thermoplastic material around the pipe. From U.S. Pat. No. 6,440,245, it is known a ready-to-use multi-layer coextruded sheathing comprising at least the 3 layers system in a single sheathing. The multi-layer sheathing is previously heated and then transferred with a roller having a larger diameter than the pipe, around the pipe. According to U.S. Pat. No. 6,440,245, the applicator roller needs to be at least the pipe diameter or bigger. This feature restrict the ability of the machine to coat large diameters pipes, when line pipes are already landed and welded over kilometers, because, it will be no more possible to change the line pipe height relative to the ground.

Now, it is known from US-2014-0076483, a machine for coating a pipe joint with a cylindrically wound unheated sheet of synthetic resin on the joint that is already coated with 2 layers. The machine includes a mounting frame mountable on adjacent coated sections of the pipeline to span the pipe joint being coated and a transport carriage rotatably movable on the mounting frame to move circumferentially about the pipe joint. A storage reel is mounted on the transport carriage for storing a supply of the unheated sheet of synthetic resin to be wound about the pipe joint. An applicator roller is mounted on the carriage frame and applies the unheated sheet of synthetic resin from the storage reel onto the pipe joint as the transport carriage moves about the circumference of the pipe joint. A heater is mounted on the transport carriage to heat the applied unheated sheet of synthetic resin after it has been applied to the pipe joint, to preheat the substrate and the factory coating overlap area, the newly applied unheated sheet of synthetic resin material, and the previously applied material on subsequent revolutions of the applicator.

This machine has several drawbacks because it needs to develop a roller with specific heating capabilities for each type of synthetic resin sheet. This system needs to apply the sheet just after having coated the first two layer of the 3LPP or 3LPE system. This feature is not allowing intermediate control of the first two layers, and in rendering temperature control very difficult due to inevitable change in the production line speed. And the main drawback is the risk of having air trapped between each successive layers of wrapped sheet material provided for an efficient protective coating.

It is also known from WO-2008/107759 a method of forming a protective joint coating around a weld, the method comprising the steps of: laying a thermoplastic sheet on a supporting sheet, winding the thermoplastic sheet and the supporting sheet about the weld to join the thermoplastic sheet to the weld, the supporting sheet being removed when the protective coat is completed. This solution is unsatisfactory, as it requires to add a cement layer of Gunite to bridge the thermoplastic sheet with the factory coating. Moreover the management of the supporting sheet according to this method is difficult to perform without damaging the thermoplastic sheet, because it requires to move a roller in such a way to detach the supporting sheet from the thermoplastic sheet.

SUMMARY OF THE INVENTION

An object of the invention is a machine for coating a pipe, especially a pipe joint formed after welding together stub ends of coated sections of pipe for a pipeline, the coating comprising a sheet applied circumferentially around the pipe, the machine comprising:
- a mounting frame located adjacent the pipe joint, preferably the pipe joint being primarily coated;
- a transport carriage rotatably movable on the mounting frame to move circumferentially about the pipe joint;
- a sheet application roller movable around the pipe, the roller being supported by an axis linked to the transport carriage, the roller being free to rotate around this axis, preferably this axis being parallel to the axis of the pipe;
- a push system pressing radially the roller against the pipe in order to obtain a rotatory-revolutionary movement of the roller against the pipe;
- a mat configured to receive a sheet to be coated onto the pipe;
- a feed table to transfer the mat covered with the sheet from an oven in the vicinity of the pipe,
- a mat pusher to hold and maintain a first part of the mat in the vicinity of the pipe, when the roller is applying a second part of the mat against the pipe.

The present invention achieves a better adhesion of the sheet wrapped around the pipe, the sheet being the last third layer of the 3LPP or 3LPE system, with high quality control of the former 2 layers. The machine and process of the invention achieves an excellent adhesion to the factory coating and the former 2 layers system, for example an adhesion that may withstand strength forces over 600 N/25 mm, and also excellent adhesion of the overlapped ends of the sheet that may withstand strength forces superior to 600 N/25 mm.

Preferably, the mat pusher may comprise an out feed table movable between a closed position and a retracted position, such that the roller has room to support the mat when the out feed table is in the retracted position. This feature allows the roller to press the mat supporting a sheet against the pipe joint at a location distant from the overlapping ends of the sheet.

Preferably, the feed table may be movable in order to allow the passage of the roller, when the roller is applying the first part of the mat against the pipe. This feature allows the mat to be supported respectively by at least one or both of the feed table and the out feed table depending on the roller position relative to the mat.

Preferably, the mat pusher may comprise alignment means in order to adjust the orientation of the mat supporting a sheet perpendicularly to the pipe axis. The mat pusher may also be adjusted laterally to perfectly match the annular zone of the pipe joint to be covered.

For example, the mat may be a composite carrier comprising a foam layer covered by a silicone rubber profiled surface, where preferably the foam layer is an open cell silicon foam layer larger and the profiled surface is a silicone rubber film, such that the foam layer is larger than the profiled surface. Alternatively, the silicone rubber film may be a PTFE (polytetrafluoroethylene) film. The mat allows almost any consistency of the heated sheet, and allows for a wider range of thermo-mechanical properties of the sheet, even as an almost liquid state sheet.

In order to adapt to the specific toroidal shape of the welded zone, the profiled surface of the mat may comprise two longitudinal parallel beads, configured to adjust to both lateral sides of the annular weld cap. Such conformance to the weld cap help preventing air trapped bulbs on both side of the weld cap at the interface between the pipe and the sheet, and also avoid burn through problem. The profiled surface may also comprise two additional longitudinal parallel beads, configured to adjust to both lateral edges of a factory coating of the pipe joint. Alternatively, but not tested, any profile of foam can be conceived specifically developed in shape, and hardness to accommodate a multiplicity of joint profiles.

According to the invention, the roller is preferably movable both clockwise and counterclockwise with reverse rotation being monitored and achievable at any location around the pipe.

Preferably, the roller is cylindrical in shape with parallel generatrices. Moreover, based on the concept of one size fits all, a single roller size may be used for all pipe from 50.8 mm (2") to 304.8 mm (12"), even 350.6 mm (14") pipe outer diameter. The outer diameter of the cylindrical roller may be 300 mm or less.

Advantageously, the machine according to the invention may comprise pipe supports on either side of the roller in order to limit the movement of the pipe while the roller is applied against the pipe.

The mounting frame may comprise two end plates secured together, both end plates having a hole to accommodate the pipe, and the transport carriage comprises two guide rings both rotatable around the pipe, such that each guide ring is mounted on a respective end plate of the two end plates.

To ease the use of the machine, guide rings are motorized, one of the guide rings may transmit the movement to the other guide ring by an axle and means of a motorized cinematic chain.

In addition to the optimized regulation of the application of the sheet, and in order to help motorization, the guide rings may comprise counterweights to balance the weight of the roller.

The roller may comprise adjustment means to be moved radially relatively to the pipe in order to adjust the pressure, and adapt to the eccentricity and ovality of the pipe. Adjustment means may be defined prior to pressing the roller against the pipe body, prior to each new cycle. Additionally the transport carriage may comprise a pipe diameter compensation cylinder to adjust the axis of rotation of the roller.

As an optimized regulation of the application of the sheet around the pipe, the push system may be a low friction air cylinder powered and regulated in function with the angular location of the roller around the pipe. Further, by incorporating a counter balance, the effective control of the pressure developed by the push system is optimized.

In order to improve the quality of the coated sheet, the machine may comprise an overlap heater in order to heat locally the overlapping area of the overlapping ends of the sheet transferred to the pipe, such as for instance infrared resistances, hot air, heating blade or wheel. Preferably, such overlap heater may be adjusted around the pipe over an angle of +/−30° around the apex of the pipe, preferably at +/−10° to the apex.

In order to provide a full integration, the machine according to the invention may comprise a preliminary circumferential heater to heat the pipe field joint profile at a previous stage, prior to translating the heated pipe to the next station where the machine will ensure transfer of the sheet to the heated pipe.

Additionally, the machine may comprise an oven configured to heat the sheet in a heating station such that a feed table of the heating station provides the mat pusher with a heated sheet on a mat. This heating station allows a controlled process where temperatures and times are under control.

Another object of the invention is a method for the anticorrosive protection in situ of an annular area of a pipe, wherein the method includes the stages of:

a) heating a sheet placed onto a mat;

b) moving a mat pusher with the mat and its heated sheet below the pipe;

c) sliding an out feed table of the mat pusher in a retracted position and pressing a roller on the mat in order to obtain contact of a first part of the sheet with the pipe;

d) rotating the roller around the pipe in a first direction, in order to apply the first part of the sheet onto the pipe, then rotate the roller in the opposite direction in order to apply the second part of the sheet onto the pipe, pressure being exerted onto the roller during application of the sheet, extremity of the second part of the sheet overlapping the extremity of the first part of the sheet.

Preferably, for a better management of the mat with the above method, when the roller is moved in the opposite rolling direction, it allows the mat to be separated from the sheet and fall back on the out feed table, the out feed table being moved from the retracted position back to a closed position for that purpose, and a feed table being then moved away from the out feed table to allow the roller to rotate in the opposite direction.

Preferably to achieve better results, the method may comprise a prior stage where the pipe to be coated is previously circumferentially heated to a temperature distinct from the heated sheet temperature. This ensures precise, and defined application temperature is achieved.

In order to optimize the coating to the cut ends of the factory coating, it is preferable to have a gradient of temperature formed within the heated sheet in order to obtain lateral location with the factory coating at a higher temperature than the center, both lateral location being intended to apply against those chamfered coated sections of pipe, while the center is applied against a primary coating, for example the primary coating being a 2 layer system previously placed on the annular area. This thermal regulation enhances adhesion to factory coating.

Preferably the sheet may be heated to melt point, so that a semi-molten web of plastic is applied to the pipe. This improves how air is expelled from the interface between pipe and polymer coating. Thus a better adhesion with less pressure is achieved and protection of the weld cap is enhanced.

Preferably, the first part of the sheet placed in contact with the pipe may be away from overlapping ends of the sheet, especially biased towards the midpoint but not necessarily at the midpoint.

The invention also applies to a thermoplastic sheet applied circumferentially around a pipe, for example with a machine according to the invention, wherein the sheet has chamfered overlapping ends, in order to limit the thickness of the applied sheet where those chamfered overlapping-ends are overlapping.

Preferably, to improve protection of the weld cap, the sheet may have a maximum thickness along a circumferential central line that is intended to be applied against an annular weld cap of the pipe joint.

It is conceived that the invention can be used to add additional outer sheets, to form a composite of two, three or more overlaying sheets laminated and bonded together, each additional sheet being of the same or differing material, so as to improve the functional properties of the coating.

BRIEF DESCRIPTION OF THE DRAWINGS

FIGS. 7.1 to 7.5 are schematic views of steps of the process of a machine according to the claimed invention;

DETAILED DESCRIPTION OF THE PREFERRED EMBODIMENTS

Figure 1:
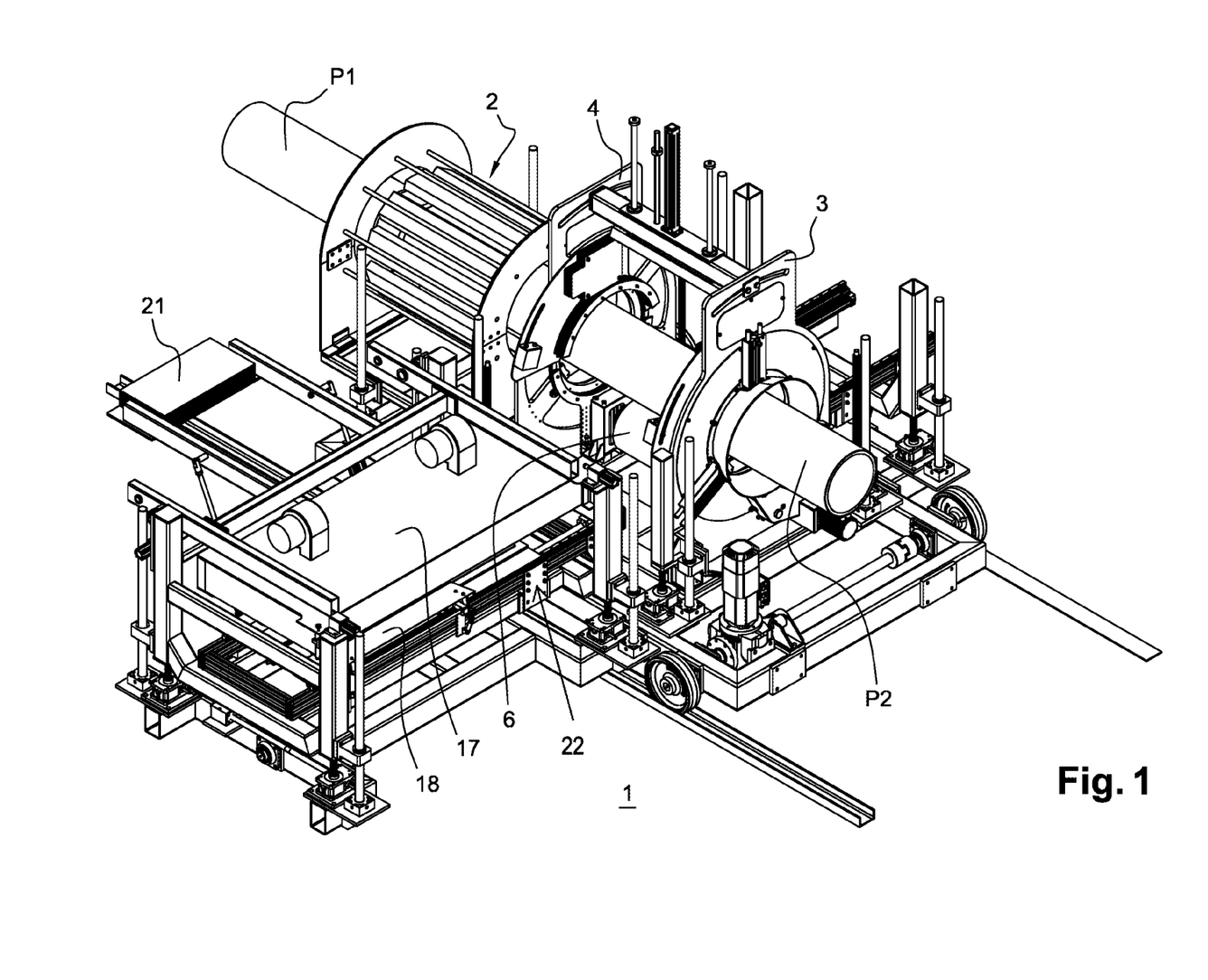
FIG. 1 is an overall side perspective view of a machine according to the claimed invention.

FIG. 1 show a machine 1 according to the invention mounted around two pipes P1 and P2 welded together. A circumferential heater 2 is placed next to machine 1. Pipes first go through the circumferential heater 2 prior being within machine 1. Machine 1 is dedicated to coating a pipe with a sheet 20 to apply circumferentially around the pipe.

Figure 2:
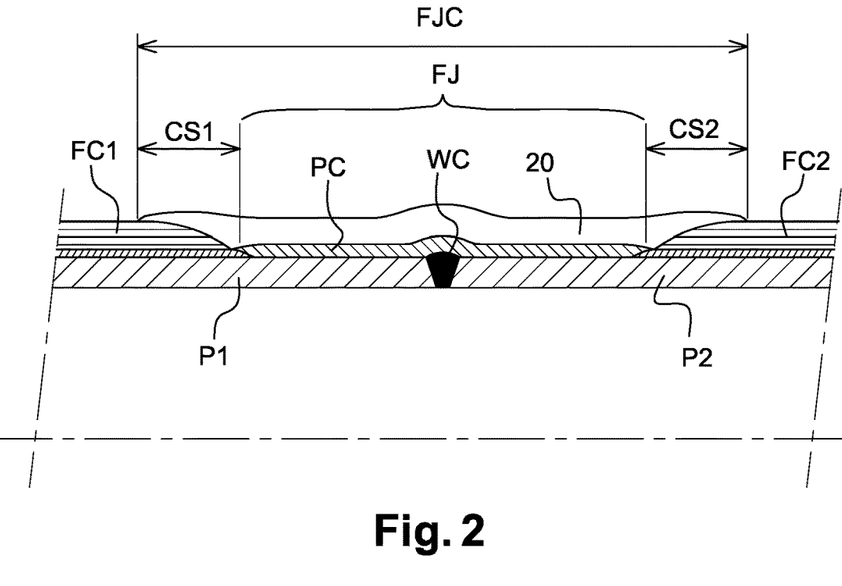
FIG. 2 is a schematic view of a pipe to be coated according to the present invention.

The principle of the invention is to wrap a pre-cut sheet around at least the circumference of a field joint FJ formed between pipes P1 and P2. The field joint FJ, schematically represented on FIG. 2 is obtained by any suitable welding process, and comprises a weld cap WC. The weld cap WC may also be covered with a primary coating PC of the field joint FJ. Pipes P1 and P2 are externally covered by a factory coating, respectively FC1 and FC2. Prior to the welding of P1 together with P2, factory coating is partially removed on both pipes in order to present naked end pipe sections able to be welded together. For example, factory coating is removed along respectively a chamfered section CS1 and CS2. After naked pipe end sections are welded, then the weld cap is covered by a primary coating PC. The aim of the invention is to wrap the sheet (or final layer FL) at least all around the weld cap WC, better all around the primary coating PC, and even better all around the primary coating PC and if existing remaining naked pipe section of P1 and P2, and also around at least part of both chamfered section CS1 and CS2 of respective factory coating FC1 and FC2. As shown on FIG. 2, the sheet 20 is fully covering CS1, FJ and CS2.

Now for the sake of clarity, the description of the invention will be referred to a sheet 20 applied onto a pipe, pipe being comprising any above specific construction, as for example described above.

Applied using a rolling action, the sheet 20 is pushed onto the pipe with pressure so that the sheet adheres to the primary coating PC. Adhesion is promoted by pre-heating the sheet 20 and the field joint, especially all the primary coating PC, sufficient to ensure fusion through localized and controlled melting, consequently satisfying the minimum specified adhesive force.

Machine 1 comprises a system for supporting the pipe, such system comprises hollow pipe frames 3 and 4 and holding means 5 to hold the pipe on either side of the location to be coated. The function of the system for supporting the pipe is to limit the movement of the pipe while the sheet 20 is applied around the pipe. The system is adjustable for different ranges of pipe diameters. Holding means 5 comprise equally spaced radial pushers. For example, as shown on FIGS. 1 and 3, holding means 5 may comprise three 120° spaced radially oriented pipe supports.

Figure 3:
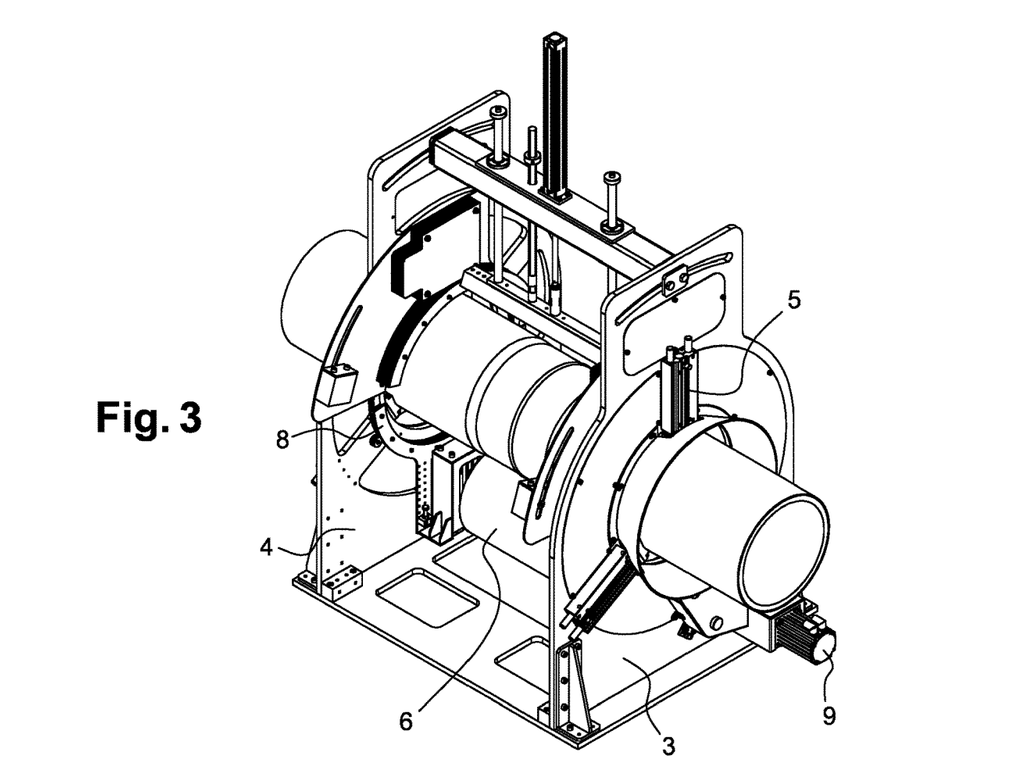
FIG. 3 is a side perspective view of the machine of FIG. 1 without the mat pusher and the mat.
Figure 4:
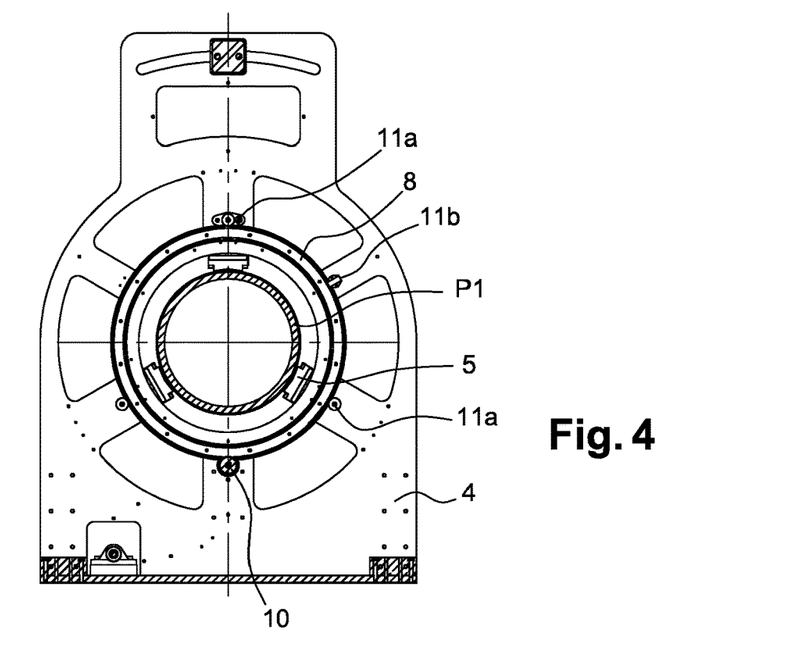
FIG. 4 is an end view of the mounting frame of a machine according to the claimed invention.

Machine 1 comprises a sheet application roller 6 freely rotatable around an axle maintained between two guide rings, respectively 7 and 8. Guide rings 7 and 8 are rotatable relative to their respective pipe frame 3 and 4. A motor 9 is rotating a pinion 10 engaged via a drive system with the guide ring 8. Stabilization rollers 11 are ensuring vertical (11a) and lateral (11b) position of the guide ring relative to its pipe frame when rotating. Rotation of both guide rings 7 and 8 are synchronized. For example, motorized transmission of the movement of guide ring 7 is transmitted to guide ring 8 with motorized cinematic chain (not shown).

Figure 5:
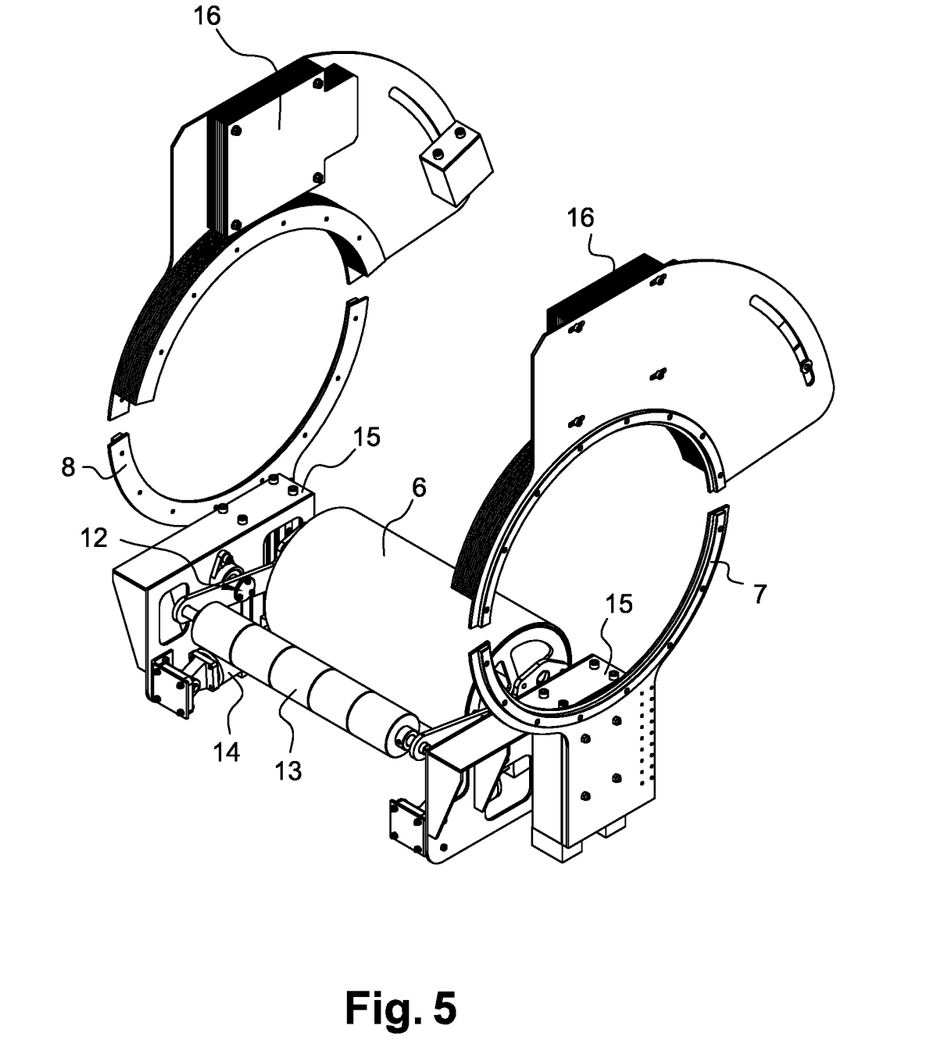
FIG. 5 is a side perspective view of a transport carriage together with a a sheet application roller and its push system of a machine according to the claimed invention.

Axle of the roller is maintained by a pivot bearing 12 in a controlled contact position with the pipe, due to a balance with load balance weights 13, and low friction air cylinder management 14.

Position of the axle of the roller is managed through a pipe diameter compensation push system 15, able to adapt to a slight eccentricity and ovality of the pipe in machine 1.

Roller being located at one location around the guide rings. Guide rings are both equipped with counter balance weights 16. Guide rings, and consequently the roller is able to roll either clockwise or counterclockwise around the pipe.

Machine 1 also comprises an oven 17 to heat the sheet prior to being transferred to the pipe. The oven 17 may be an infra-red heating system.

Machine 1 comprises a feed table 18, or shuttle table 18, to transfer a mat 19 covered with the sheet 20 to apply into the oven 17, where the sheet 20 will be heated. The sheet 20 may be heated to a physical state where there may still be a mix of liquid and molten and solid material. The sheet 20 is preferably pre-cut to adapted dimension. Several sheets may be arranged in a stack 21 ready for handling to the oven 17. Sheet is made of polypropylene or polyethylene, or other composite thermoplastic polymers.

Figure 6:
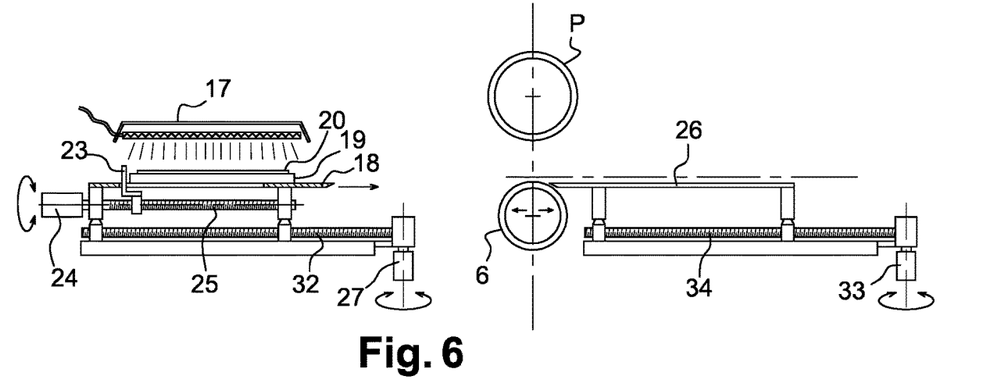
FIG. 6 is a schematic perspective view of a mat pusher with a mat and a sheet on the mat according to the claimed invention.

The feed table 18 comprises longitudinal guides 22 able to cooperate with a mat pusher 23 able to shift the mat 19 and its heated sheet 20 from the oven 17 to the vicinity of the pipe. The mat pusher 23 is driven by a servo motor 24 driving a pusher ball screw 25 engaged with the mat pusher 23. Preferably the mat pusher 23 is bringing the mat below the pipe to coat.

The mat pusher 23 comprises an out feed table 26. The mat pusher 23 cooperates with the feed table 18, such that the out feed table 26 is movable between a closed position and a retracted position relative to the feed table 18. In the closed position, the mat 19 is fully supported by the mat pusher 23, meaning fully supported by the feed table 18 and the out feed table 26. When the mat with sheet is in the oven 17, the out feed table 26 is in the retracted position. Before the mat feeder can advance the mat with sheet to the underside of the field joint, the out feed table 26 must be moved to the closed position, so that the overlapping ends of the mat are supported respectively by the feed table 18 and the out feed table 26.

Figure 72:
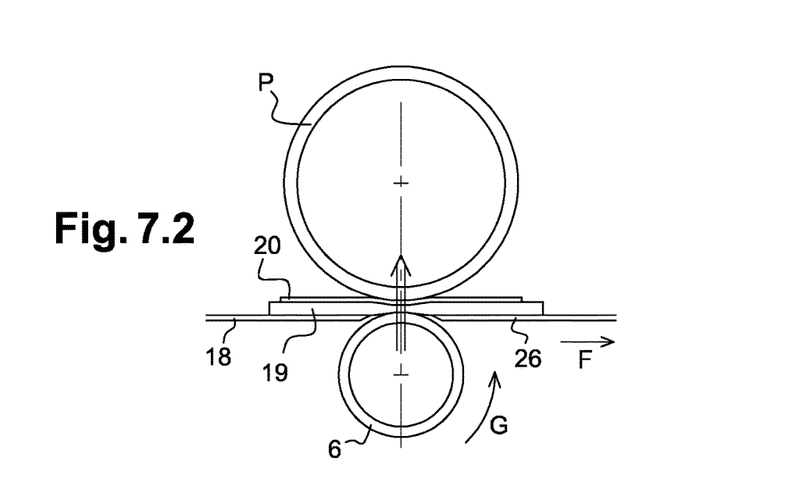

A central portion of the mat 19 when located in the advanced position is supported by roller 6. Preferably, when the mat pusher is below the pipe and the roller 6 is raised into contact with the accessible part of the mat, and the mat and its heated sheet is in contact with the pipe, as shown on FIG. 7.2. then out feed table 26 is placed in the retracted position. Translation of the out feed table 26 is obtained with an out feed table motor 33 cooperating with an out feed table screw 34 engaged with the out feed table 26.

The out feed table 26 is even more driven away along direction F, to manage enough room for the roller 6. Here, the process according to the invention doesn't need to place the sheet under tension, only to press it with an appropriate pressure in order for it to adhere. As such the roller is pressed and rolled around the pipe circumference in at first direction C. Thus it is possible to bring the thermoplastic sheet up to a temperature where it could not normally be placed under tension. Moreover, the temperature selection for the sheet is chosen to optimize adhesion with the only constraint being that the mat can withstands the sheet temperature during its application.

Figure 73:
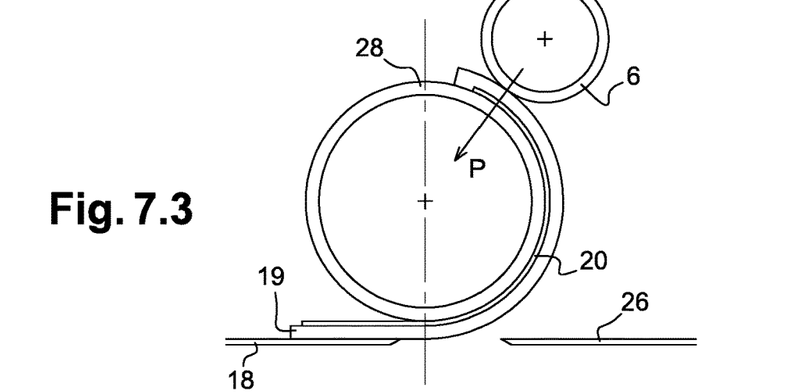

FIG. 7.3, the roller is at its first maximum position in the first rotating direction C, up to a point for example that is almost 170° over the initial point where the roller started to press the sheet onto the pipe. This position is 10° from the apex location 28 of the pipe.

Figure 74:
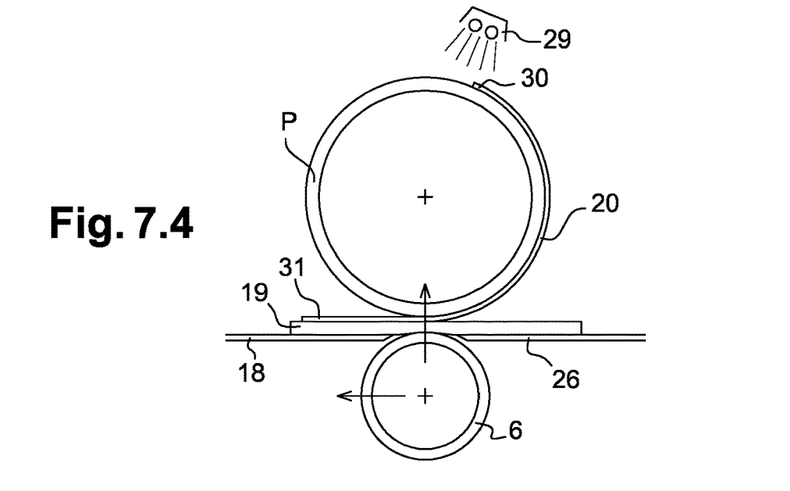

Then the roller is moved in the opposite rolling direction, and allows the mat to separate from the sheet and fall back on the feed out table 26, feed table 18 being retracted in the direction of the oven 17. When rolling down, according to FIG. 7.4, an overlap heater 29 can be used to maintain the heat of the first overlapping end 30 of the sheet 20 already applied onto the pipe.

When the roller is at the bottom location of the pipe, it continues rolling in this direction opposite to the first rolling direction C. To this end, feed table 18 is moved back in order to allow the passage of the roller 6 to press the mat and the heated sheet onto the pipe. A feed table motor 27 engaging a feed table screw 32 allows translation of the feed table 18.

Figure 75:
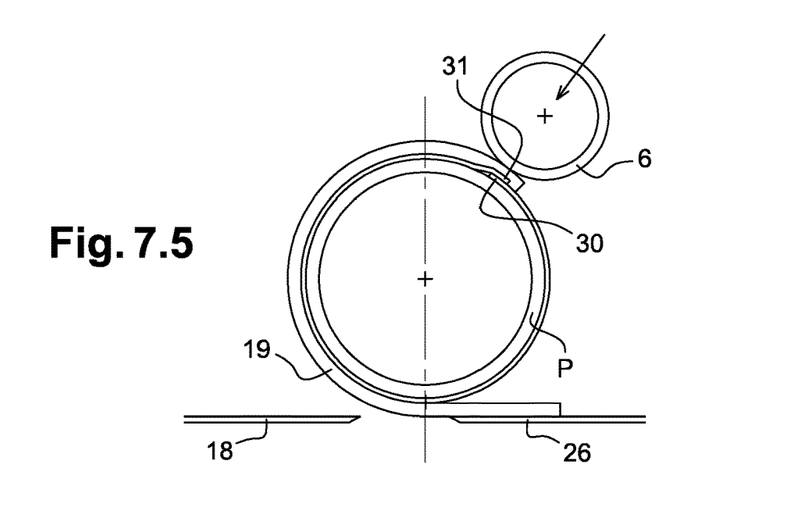

Due to the fact, that in the first rolling direction, the roller stopped away from the apex 28, in this opposite rolling direction, the roller 6 goes up to the apex 28, and up to the previous final location in order to bring the second overlapping end 31 of the sheet to overlap the first overlapping end 30. The overlap heater 29 provided sufficient heat to ensure both overlapping ends join. Overlapping ends 30 and 31 are preferably chamfered in order to limit the overlap thickness.

Through out the rotation of the roller around the pipe, the same pressure is applied to the mat, in order to allow and uniform adhesion of the sheet to the pipe, accomplished using the counterweight system. The roller 6 is performing a two part turn in respective opposite direction. Nevertheless, if found necessary it is possible to vary the application pressure of roller 6 against the mat and pipe P as a function of the roller position.

When the roller ends the rotation, it rolls back in the first rolling direction C, and allows the mat to separate from the sheet and fall back on the feed table 18.

Figure 8:
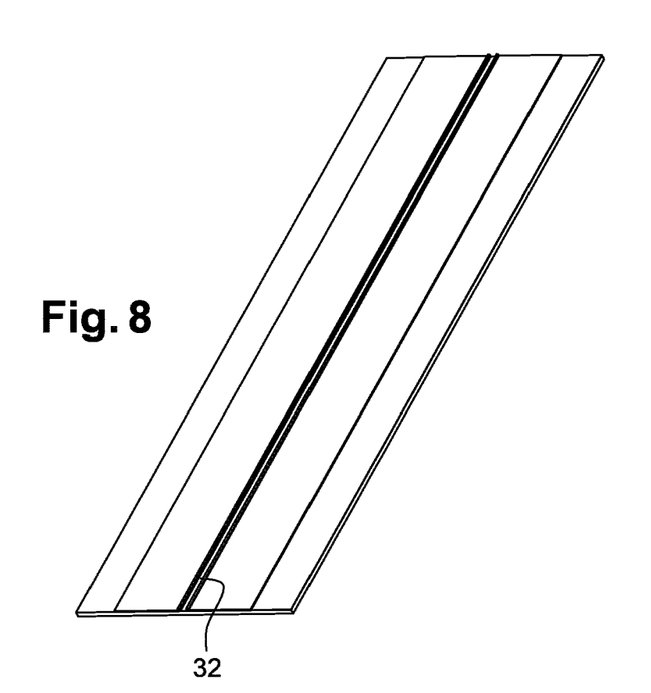
FIG. 8 is a perspective view of a mat of a machine according to the claimed invention.
Figure 71:
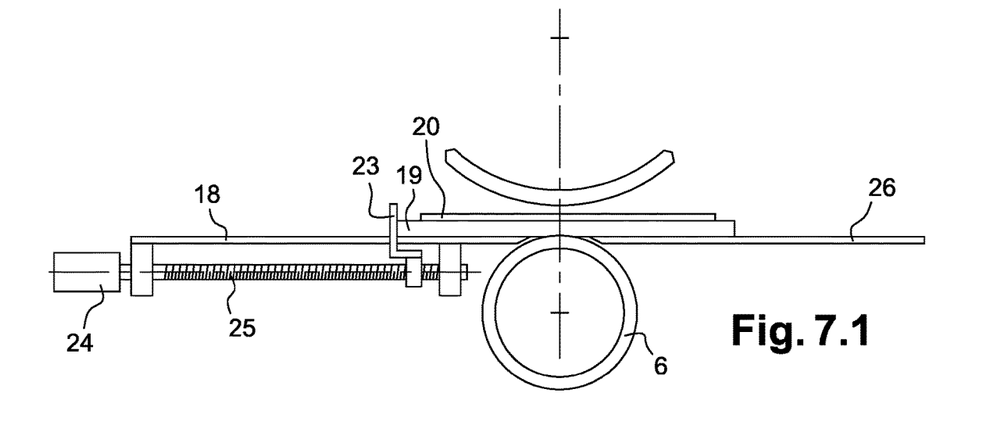

The mat 19 allows heat insulation to keep the sheet at a desired temperature. The mat helps conformance to the field joint profile due to the specific profile of the mat with longitudinal beads 32. The mat 19 is in a material that is not sticking to the sheet, even at the hottest temperature the sheet is brought to.

The mat 19 is made of an open cell silicon foam layer covered by a silicone rubber film, such film may comprise PTFE. The foam layer is larger than the profiled film.

The invention claimed is:

1. A machine for coating a pipe, or a pipe joint between welded end stubs of coated sections of a pipe for a pipeline, the coating including a sheet to apply circumferentially around the pipe, the machine comprising:
   a mounting frame mountable on adjacent sections of the pipeline to span the pipe joint;
   a transport carriage rotatably movable on the mounting frame to move circumferentially about the pipe joint;
   a sheet application roller movable around the pipe, the roller being supported by an axis linked to the transport carriage, the roller being free to rotate around this axis;
   a push system pressing radially the roller against the pipe to obtain a rotatory-revolutionary movement of the roller against the pipe;
   a mat configured to receive a sheet to be coated onto the pipe;
   a feed table to transfer the mat covered with the sheet from an oven in vicinity of the pipe;
   a mat pusher to hold and maintain a first part of the mat in the vicinity of the pipe, when the roller is applying a second part of the mat against the pipe, wherein the mat pusher comprises an out feed table movable between a closed position and a retracted position such that the roller has room to support the mat when the out feed table is in the retracted position, and wherein the feed table is movable to allow passage of the roller, when the roller is applying the first part of the mat against the pipe.

2. A machine according to claim 1, wherein the mat is a composite carrier comprising a foam layer covered by a silicone rubber profiled surface, wherein the foam layer is an open cell silicon foam layer and the profiled surface is a silicone rubber film, such that the foam layer is larger than the profiled surface.

3. A machine according to claim 2, wherein the profiled surface comprises two longitudinal parallel beads, configured to adjust to both lateral sides of an annular weld cap of the pipe joint.

4. A machine according to claim 2, wherein the profiled surface comprises two additional longitudinal parallel beads, configured to adjust to both lateral sides of a primary coating covering an annular weld cap of the pipe joint.

5. A machine according to claim 1, wherein the roller is movable clockwise and counterclockwise around the pipe.

6. A machine according to claim 1, wherein the roller is cylindrical in shape with parallel generatrices.

7. A machine according to claim 1, wherein the roller is movable radially relatively to the pipe to adjust pressure, and to adapt to eccentricity and or ovality of the pipe.

8. A machine according to claim 1, wherein the push system is a low friction air cylinder powered and regulated in function of location of the roller around the pipe.

9. A machine according to claim 1, further comprising pipe supports on either side of the roller to limit movement of the pipe while the roller is applied against the pipe.

10. A machine according to claim 1, wherein the mounting frame comprises two end plates secured together, both end plates including a hole to accommodate the pipe, and the transport carriage comprises two guide rings both rotatable around the pipe, such that each guide ring is mounted on a respective end plate of the two end plates, such that the guide rings are motorized, one of the guide rings transmitting movement to the other guide rings by an axle and a motorized cinematic chain.

11. A machine according to claim 10, wherein the guide rings comprise counterweights to balance weight of the roller.

12. A machine according to claim 1, wherein the transport carriage comprises a pipe diameter compensation cylinder to adjust the axis of rotation of the roller.

13. A machine according to claim 1, further comprising an overlap heater to heat locally an overlapping area of ends of the sheet transferred to the pipe, such overlap heater being adjustable around the pipe over a radius of +/−30° around an apex of the pipe.

14. A machine according to claim 1, further comprising a preliminary circumferential heater to heat the pipe at a previous stage, prior to transferring the sheet to the heated pipe.

15. A machine according to claim 1, further comprising the oven and the feed table, the feed table cooperating with the mat pusher.

16. A method for anticorrosive protection in situ of an annular area of a pipe, comprising:
a) heating a sheet placed on a mat;
b) moving a mat pusher with the mat and its heated sheet below the pipe;
c) sliding an out feed table of the mat pusher in a retracted position and pressing a roller on the mat to obtain contact of a first part of the sheet with the pipe;
d) rotating the roller around the pipe in a first direction, to apply the first part of the sheet onto the pipe, then rotating the roller in an opposite direction to apply a second part of the sheet onto the pipe, pressure being exerted onto the roller during application of the sheet, extremity of the second part of the sheet overlapping extremity of the first part of the sheet.

17. A method according to claim 16, wherein when the roller is moved in the opposite rolling direction, the mat can separate from the sheet and fall back on the out feed table, the out feed table being moved from the retracted position back to a closed position, a feed table being then moved away from the out feed table to allow the roller to rotate in the opposite direction.

18. A method according to claim 16, wherein the pipe to be coated is previously circumferentially heated to a temperature distinct from a temperature of the heated sheet.

19. A method according to claim 16, wherein a gradient of temperature is formed within the heated sheet to obtain lateral location at a higher temperature than the center, the lateral location to apply against chamfered coated sections of pipe, while the center is applied against a primary coating.

20. A method according to claim 16, wherein the sheet is heated towards a melt point, so that a soft or semi-molten web of plastic is applied to the pipe.

21. A method according to claim 16, wherein the first part of the sheet placed in contact with the pipe is away from overlapping ends of the sheet.

22. A method according to claim 16, wherein an additional sheet can be applied around the pipe to form a composite of at least two overlaying sheets laminated and bonded together.

* * * * *